(12) United States Patent
Shah et al.

(10) Patent No.: US 10,917,305 B2
(45) Date of Patent: Feb. 9, 2021

(54) METHOD AND SYSTEM FOR CONDUCTING AUDIT FOR AN ASSESSMENT PLATFORM

(71) Applicant: Tata Consultancy Services Limited, Mumbai (IN)

(72) Inventors: Viral Prakash Shah, Mumbai (IN); Abhirup Das, Mumbai (IN); Gaurav Singh, Mumbai (IN); Neeta Jasvindersingh Kabo, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 13 days.

(21) Appl. No.: 15/802,883

(22) Filed: Nov. 3, 2017

(65) Prior Publication Data

US 2018/0287880 A1 Oct. 4, 2018

(30) Foreign Application Priority Data

Mar. 30, 2017 (IN) .............................. 201721011543

(51) Int. Cl.
*H04L 12/24* (2006.01)
*G06Q 10/06* (2012.01)
*G06Q 50/20* (2012.01)
*H04L 12/26* (2006.01)
*H04L 29/06* (2006.01)

(52) U.S. Cl.
CPC ....... *H04L 41/12* (2013.01); *G06Q 10/06395* (2013.01); *G06Q 50/205* (2013.01);
(Continued)

(58) Field of Classification Search
CPC . H04L 41/12; H04L 43/0841; H04L 43/0858; H04L 43/106; H04L 65/80;
(Continued)

(56) References Cited

U.S. PATENT DOCUMENTS

| | | | | |
|---|---|---|---|---|
| 5,812,780 A | * | 9/1998 | Chen ..................... | G06F 11/261 709/224 |
| 2004/0067751 A1 | * | 4/2004 | Vandermeijden ....... | H04M 1/57 455/414.1 |

(Continued)

FOREIGN PATENT DOCUMENTS

| | | | | |
|---|---|---|---|---|
| CN | 201491036 | * | 5/2010 | ............. H04L 29/06 |
| CN | 104952013 | | 9/2015 | |

*Primary Examiner* — Abdelillah Elmejjarmi
(74) *Attorney, Agent, or Firm* — Finnegan, Henderson, Farabow, Garrett & Dunner, LLP

(57) ABSTRACT

A method and system for conducting audit for an assessment platform is provided. The disclosure provides an automated audit process that will guarantee the computer systems along with the network will hold well during the course of the online examination. The system mainly comprises a primary server checking module and a captivation module. The primary server checking module is configured to perform the system level, browser level, network level and bandwidth level tests to ensure better risk management and reflect the exact capacity of the online examination center. A network congestion will also be built for a prolonged duration of time. The captivation module is gateway for deploying different local instance solutions. The restrictions it will impose will prevent any sort of malpractice (from remote agents as well) and optimize the use of CPU and memory to bring forth best performance of the system during the course of the exam.

9 Claims, 4 Drawing Sheets

(52) U.S. Cl.
CPC .......... *H04L 43/0858* (2013.01); *H04L 43/50* (2013.01); *H04L 65/80* (2013.01); *H04L 43/0841* (2013.01); *H04L 43/106* (2013.01)

(58) Field of Classification Search
CPC ..................... H04L 43/05; G06Q 10/06395; G06Q 50/205; Y04S 10/54
See application file for complete search history.

(56) References Cited

U.S. PATENT DOCUMENTS

| | | | |
|---|---|---|---|
| 2005/0188112 A1* | 8/2005 | Desai .................... | H04L 47/115 709/247 |
| 2006/0159025 A1 | 7/2006 | Abdo et al. | |
| 2007/0088630 A1* | 4/2007 | MacLeod ............ | H04L 41/0856 705/28 |
| 2008/0168118 A1* | 7/2008 | Hickey ................. | G06F 13/385 709/201 |
| 2009/0018731 A1* | 1/2009 | Grenell ................... | B60R 16/03 701/51 |
| 2011/0001833 A1* | 1/2011 | Grinkemeyer ....... | H04N 17/004 348/192 |
| 2014/0153626 A1* | 6/2014 | Wilson ................ | G06F 11/2252 375/224 |
| 2014/0186812 A1* | 7/2014 | Shah ........................ | G09B 7/02 434/319 |
| 2014/0351879 A1* | 11/2014 | Ohashi .................... | G06F 21/51 726/1 |
| 2018/0061126 A1* | 3/2018 | Huang ...................... | G06T 7/74 |

* cited by examiner

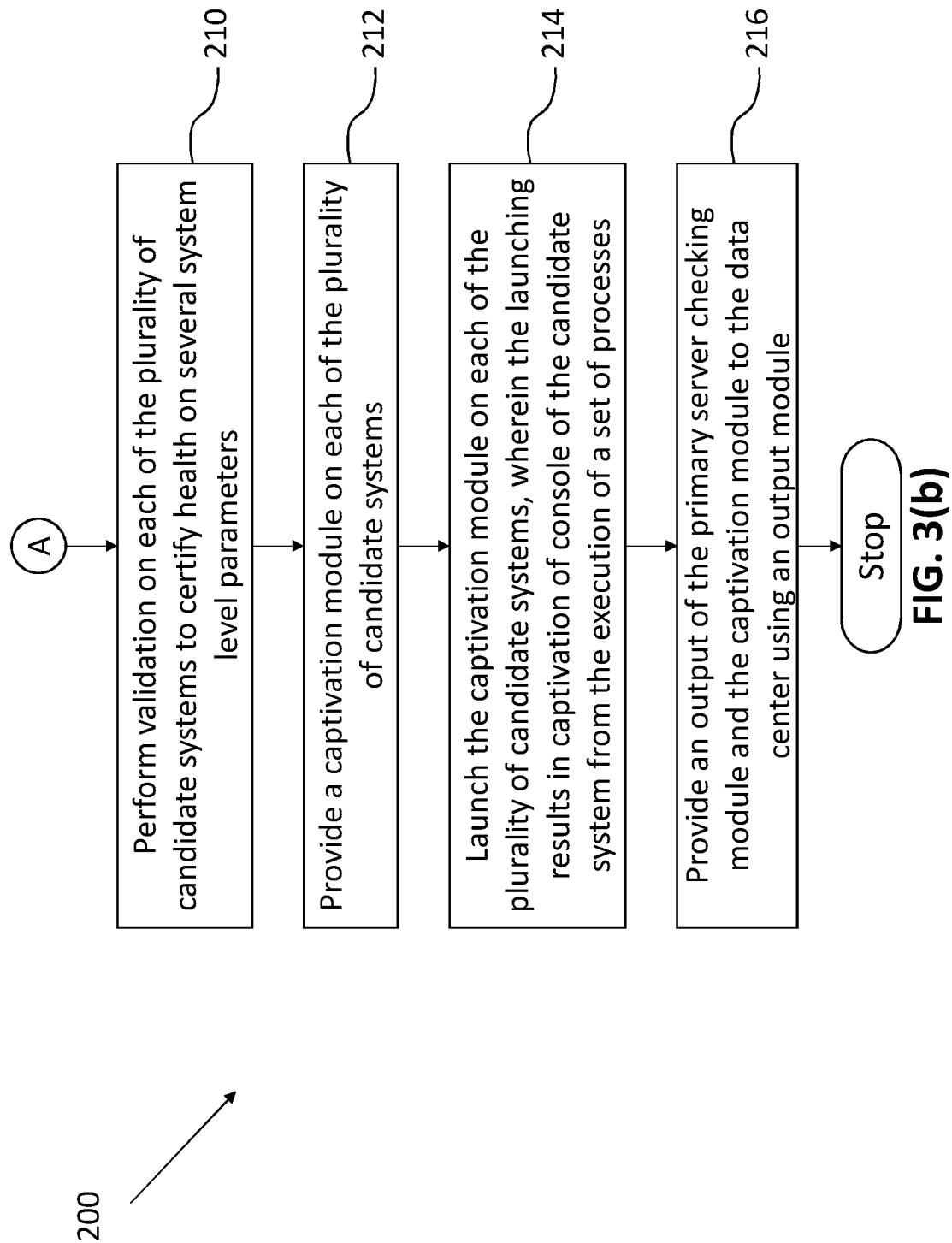

METHOD AND SYSTEM FOR CONDUCTING AUDIT FOR AN ASSESSMENT PLATFORM

PRIORITY

The present invention claims priority to India Application (Title: Method and system for conducting audit for an assessment platform) No. 201721011543, filed in India on Mar. 30, 2017.

FIELD OF THE INVENTION

The present application generally relates to the field of automated audit of an assessment platform. More particularly, but not specifically, the invention provides a system and method for conducting audit for an assessment platform conducting online exams.

BACKGROUND

A standard procedure used for measuring a candidate's competency in almost all the environments, such as academic and corporate environment is done through assessments or examinations. Due to added cost and complexity of traditional paper based assessments, computer based assessments, typically referred to as online assessments, have emerged as a popular and convenient method for administering and processing the assessments. For example, assessments that are conducted at a large scale, such as GRE, GMAT, SAT, TOEFL, LSAT, CAT, AIEEE, and other similar assessments that require more time and efforts in administration and processing, are now conducted online.

Currently, the major concern while conducting a digital online exam is the infrastructure of the centers/colleges whose computer labs are used to deliver the exam. The status of the systems need to be maintained as per the required standards. In addition to that one of the important criteria is to maintain the stability of the internet/intranet network present in the lab. Moreover, a customizing enhanced security also needed within the system to restrict any malpractice during the exam.

All the above mentioned points play an important role in ensuring delivery of a smooth, defect free examination. Therefore, it becomes absolutely necessary before conducting the exam to be sure that the infrastructure of the center/college will be able to cater to the requirements of the software being used to deliver the digital exam. Currently, labs with poor network layout or systems have redundantly caused issues during digital exams but are used repeatedly due to the lack of any guaranteed process to certify them. This hampers delivery to the end users during the course of the exam.

The existing method involves manual checking of the examination centers before the start of the online exams. This methods are cumbersome and require a lot of manual intervention. In addition to that they are not foolproof. There is still a lot of scope to research in this field of technology.

SUMMARY OF THE INVENTION

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for conducting audit of an assessment platform. The system comprises a data center, primary servers, a plurality of candidate systems, a memory, a processor in communication with the memory and an output module. The data center is connected to a plurality of test centers. The primary servers are present in each of the plurality of test centers. The plurality of candidate systems connected to each of primary servers. The processor further comprising a primary server checking module and a captivation module. The primary server checking module present on each of the primary servers. The primary server checking module is configured to perform at least one of the following: performing a system level check on each of the plurality of primary servers, performing a browser test on each of the plurality of candidate systems, performing a bandwidth test between the primary server and the plurality of candidate systems, performing a load simulation test in the entire LAN network, or performing a ping utility test between the plurality of candidate systems and the primary server. The captivation module present on each of the plurality of candidate systems. The captivation module configured to captivate a console of the candidate system from the execution of a set of processes. The output module for providing the output of the primary server checking module and the captivation module with the data center.

Another embodiment provides a method for conducting audit of an assessment platform. Initially, an internet connection is provided between a data center and primary servers. The data center and a plurality of test centers are part of the assessment platform. Each of the plurality of test centers comprising the primary server and a plurality of candidate systems. At the next step, a LAN connectivity is provided between the primary server and corresponding plurality of candidate systems. At the next step system level check is performed on each of the primary servers using a primary server checking module. Then a bandwidth check is performed to validate the network connectivity between the primary server and the plurality of candidate systems using the primary server checking module. In the next step, validation is performed on each of the plurality of candidate systems to certify health on system level parameters. Then a captivation module is provided on each of the plurality of candidate systems. The captivation module is then launched on each of the plurality of candidate systems, wherein the launching results in captivation of console of the candidate system from the execution of a set of processes. And finally, an output of the primary server checking module and the captivation module is provided to the data center using an output module.

BRIEF DESCRIPTION OF THE DRAWINGS

The embodiments herein will be better understood from the following detailed description with reference to the drawings, in which.

DETAILED DESCRIPTION OF THE INVENTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
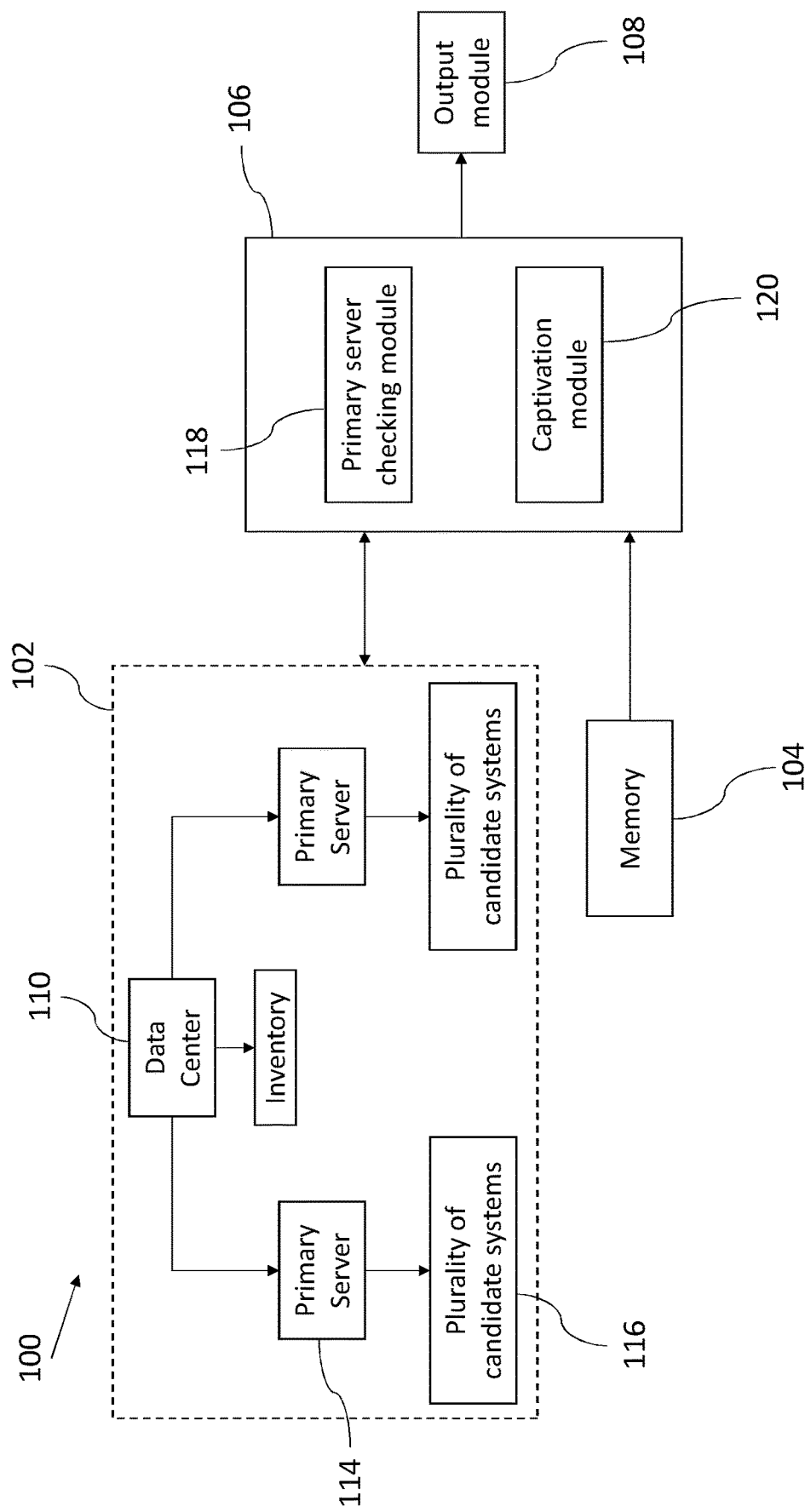
FIG. 1 illustrates a block diagram of a system for conducting audit of an assessment platform, in accordance with an embodiment of the disclosure.

Referring now to the drawings, and more particularly to FIG. 1, where similar reference characters denote corresponding features consistently throughout the figures, there are shown preferred embodiments and these embodiments are described in the context of the following exemplary system, method and/or non-transitory computer readable medium.

According to an embodiment of the disclosure, a system 100 for conducting audit of an assessment platform is shown in FIG. 1. The assessment platform refers to a platform which is used to conduct the online examination of candidates. The assessment platform may include computer machines, server, network and various other components. The disclosure provides an automated system and process for conducting an automated audit process that will guarantee the assessment platform holds good during the course of the online examination. The system 100 is configured to check the infrastructure readiness of the examination center from four main perspectives i.e. system level, hardware level, network level and security level. The system 100 will result in smooth conducting of the online exam without facing any malpractice. The disclosure provides an audit process that will set a tangible process to cater the requirements of a particular software product prior to the actual examination ensuring less risk and better delivery of the software product.

The system 100 includes an infrastructure setup 102, a memory 104, a processor 106 in communication with the memory 104 and an output module 108 as shown in the block diagram of FIG. 1. The infrastructure setup 102 further includes a data center 110, a plurality of test centers 112, primary servers 114 and a plurality of candidate systems 116. The memory 104 is configured to store a plurality of algorithms. The processor 106 further includes a plurality of modules for performing various functions. The plurality of modules access the plurality of algorithms stored in the memory 106 to perform various functions. The plurality of modules mainly include a primary server checking module 118 and a captivation module 120. It should be appreciated that the plurality of modules may also include additional modules for performing various other function.

Figure 2:
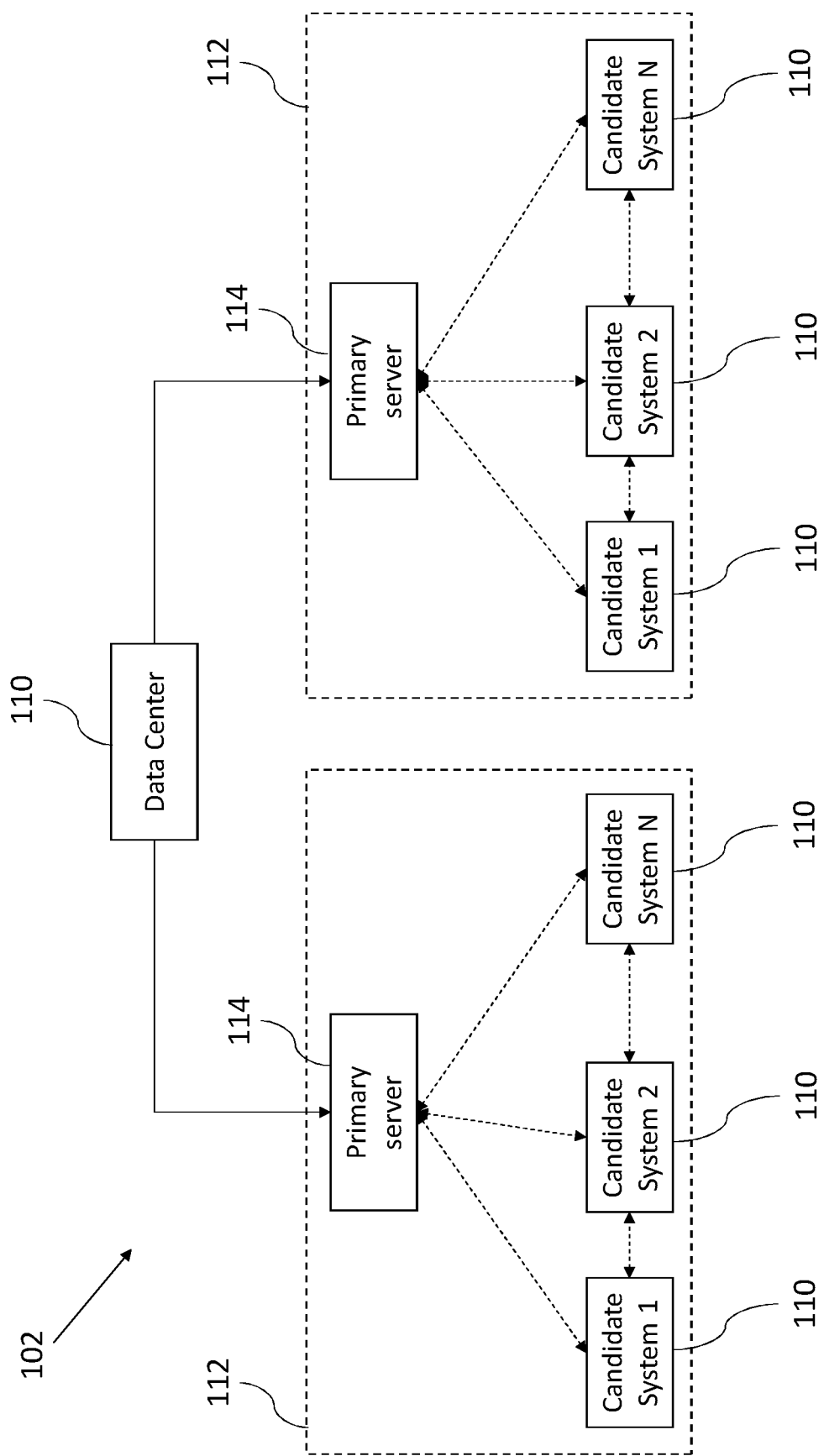
FIG. 2 illustrates a block diagram of the infrastructure setup, in accordance with an embodiment of the present disclosure.

According to an embodiment of the disclosure, a schematic diagram of the infrastructure setup 102 is shown in FIG. 2. The data center 110 is connected to a plurality of test centers 112 through the internet network. The data center 110 is the place where all the data related to online examination is stored. Depending on the requirement, the data center 110 can provide the data to the plurality of test centers 112. Each of the plurality of test centers 112 further include the primary server 114 and the plurality of candidate systems 116. Only the authorized user validated from the data center 110 can log in to the primary server 114. The plurality of candidate systems 116 could be a personal computer or a laptop. The plurality of candidate systems 116 must satisfy a predefined set of requirements. The primary server 114 and the plurality of candidate systems 116 are connected to each other through a local area network (LAN). The system 100 is connected to the infrastructure setup 102 and conduct audit to ensure the smooth and secure online examination of the candidate. The system 100 primarily uses the primary server checking module 118 and the captivation module 120 for the audit of the assessment platform.

According to an embodiment of the disclosure, the primary server checking module 118 is present on each of the primary servers 114. The primary server checking module 118 is configured to perform a plurality of function in the infrastructure setup 102. The primary server checking module 118 is configured to perform different level of bandwidth checks between the plurality of candidate systems 116 and the corresponding primary servers 114 and a network congestion will be built for a prolonged duration of time to guarantee that the network will hold good during the course of the online examination.

According to an embodiment of the disclosure, the primary server checking module 118 is configured to perform the system level check on the primary servers 114. The primary server 114 is a very important resource during the course of the exam as it is the controlling point. Hence the primary server checking module 118 validates to make sure that the following specifications are met: Processor speed—1.5 GHz or more, Random Access Memory (RAM)—1 GB RAM or more, Resolution—1024×720 or above, DHCP-DHCP should be disabled, Platform—32 bit and 64 bit, Browser—IE version 7 or above with Java script and pop up enabled.

Apart from the system level check, a bandwidth check is also triggered from the primary server 114 to validate the internet speed for its communication between the primary server 114 and the data center 110.

According to an embodiment of the disclosure, the primary server checking module 118 is further configured to perform a browser test, a bandwidth test, a load simulation test and a ping utility test. The browser test is performed on each of the plurality of candidate systems 116. The browser test validates the internet browser such that it is apt for the online examination.

The bandwidth test is meant for checking the bandwidth performance between the primary server 114 and the plurality of candidate systems 116. The plurality of candidate systems 116 upload and download three files of size 10 kB, 50 kB and 100 kB to the local primary server and then calculates the bandwidth speed in doing so. For an example the following speed were considered: 800 kBps or up as GOOD, Between 800 kBps and 67 kBps as AVERAGE, Less than 67 kBps as POOR (does not pass the bandwidth test). The intent is to certify the dedicated network between the plurality of candidate systems 116 and the primary server 114. In this case the test is initiated from the candidate system 116.

The load simulation test will be carried out when the plurality of candidate systems 116 in the LAN are connected to the primary server 114. Its purpose is to build up a certain load or congestion on the network for a period of one hour or so and monitor how the network reacts or holds on to such kind of load. This is very important to certify the entire network and how well will it hold up during the entire duration of the examination. The intent here is to certify the entire network against a lump sum load over a prolonged duration. In this case the test is initiated from the primary server 114.

The ping utility test will carry out pinging activity in bulk from the primary server 114 to the plurality of candidate systems 116 connected to it and based on the TTL and bytes received or dropped this will validate the LAN and the plurality of candidate systems 116 connected to it. All the test results get collected in the primary server 114 and shared to the data center 110 via internet. On the basis of all these we certify the primary server 114, the plurality of candidate systems 116 and the network associated with it just on one click from the candidate system 116. The intent is verify the ping operation in the network and certify it against TTL. In this case the test is initiated from the primary server 114.

According to an embodiment of the disclosure, the captivation module 120 is present on each of the plurality of candidate systems 116. The captivation module 120 is a light weight executable file called launcher 120 which needs to be copied/downloaded to any candidate system for conducting assessment on it. It should be appreciated that the terms 'captivation module' and 'launcher' can be used replaceable in the disclosure. The launcher 120 is like an authenticated gateway to start the assessment. The captivation module 120 has to downloaded once (one time activity) on a candidate system. On a single click from the captivation module 120, it provides a secure, captivated and optimized assessment console to the candidate.

When the console of the candidate system 116 is captivated then only the assessment console will appear and nothing else until the exam ends or the candidate chooses to quit the assessment. There won't be any desktop or access to any other component within the system. Keyboard and mouse will be captivated where in for the mouse only the mouse left click would be white listed. For the keyboard also only whitelisted set of characters and combinations will be allowed. All these will be implemented at the OS level. Browser configurations would be adjusted according to the assessment type. The captivation module 120 hard kills all process or service at the background in a daemon thread such that no programmatic process or service can be scheduled and executed during the assessment. Further, the captivation module 120 restricts remote desktop on the candidate system to restrict any sort of malpractice during the course of the assessment. Moreover, the captivation module 120 disables scientific calculators, or internet on the candidate system 116 to restrict any online spoofing or intervention through different desktop sharing clients again to restrict any sort of malpractice.

The following are the list of activities that gets trigger by the activation of the captivation module 120:

Grabs the MAC Address—Using NetworkInterface.GetAllNetworkInterfaces where its NetworkInterfaceType is Ethernet Keyboard and Mouse Hook—using user32.dll and kernel32.dll.

Enable\Disable task manager—Using Registry Subkey of current User under "Software\Microsoft\Windows\CurrentVersion\Policies" and "Software\Microsoft\Windows\CurrentVersion\Policies\System".

Auto Set Browser Configuration—Using Registry Subkey of current User under "Software\Microsoft\Windows\CurrentVersion\Internet Settings" and "Software\Microsoft\Internet Explorer".

The following settings will be auto configured in the browser: Active scripting—Enable, Allow script initiated windows without size or position constraints—Enable, Allow script initiated windows without size or position constraints—Enable, Allow websites to open windows without address bar or status bar—Enable, Allow websites to open windows without address bar or status bar—Enable, Use pop-up blocker—Disable, Allow programmatic clipboard access—Enable, Set zoom level to 100%, Disable the control to change the zoom level Close all running application—The captivation module 120 hard closes all running application apart from the once triggered by itself to ensure optimum performance is guaranteed by the candidate system. This process will be scheduled at a time interval of 5 minutes.

Auto Populate—Create or overwrite a hidden text file and store the last entered IP and system name. This is triggered on clicking Launch.

Removes all desktop components—Kill Progman and Shell_TrayWnd.—Kill Progman and Shell_TrayWnd.

Opens the browser—Internet Explorer is opened with the required URL generated by the launcher which enables the candidate system to connect to the Primary Server.

Launcher Auto Upgrade Feature—The captivation module 120 will upgrade to its latest version automatically on clicking on Launch button.

Restrict Remote Desktop—The captivation module 120 imposes protocol onto the system that will block all inbound connection onto the system, thus restricting any sort of remote access on the system. It will also kill desktop sharing internet agents like WebEx.

According to an embodiment of the disclosure, the system 100 includes the output module 108 for sharing the result of the online examination. At the end of the online examination, the cumulative results will be shared from the primary server 114 to the data center 110 using the output module 108 to maintain the asset information in an inventory 122 as shown in FIG. 1. Inventory management is maintained at the node level where the system MAC is treated as the differentiating parameter or primary key. This audit process is an automated procedure where in the nodes that are getting used with in a particular stipulated period will keep on increasing its validity while the once which will be left out will keep losing its validity and hence can't be used for carrying out online exam. Audit process will only have to be reinitiated if the nodes are not used for an elongated period of time and their validity gets lost.

According to an embodiment of the disclosure, following are the steps which are being performed on the primary server 114. Initially, an authorized user will log in validated from the data center. Further, select the center for which the allocation management is getting done. Then the round of checks in the primary server will get done automatically. Further following are the steps which are being performed on the candidate system 116. Initially hit the primary server 114 from any of the candidate systems 116 within the LAN through the captivation module 120. This same captivation module 120 will be used in the exam day to start the online exam console. This will be a gateway which will impose the required restriction on the candidate system 116. The exam server will only validate any request coming through the captivation module 120. The captivation module 120 performs the above mentioned activity on a single button click. The list of browser and bandwidth tests will be initialed automatically. And the result will be collected in the local server.

Figure 3A:
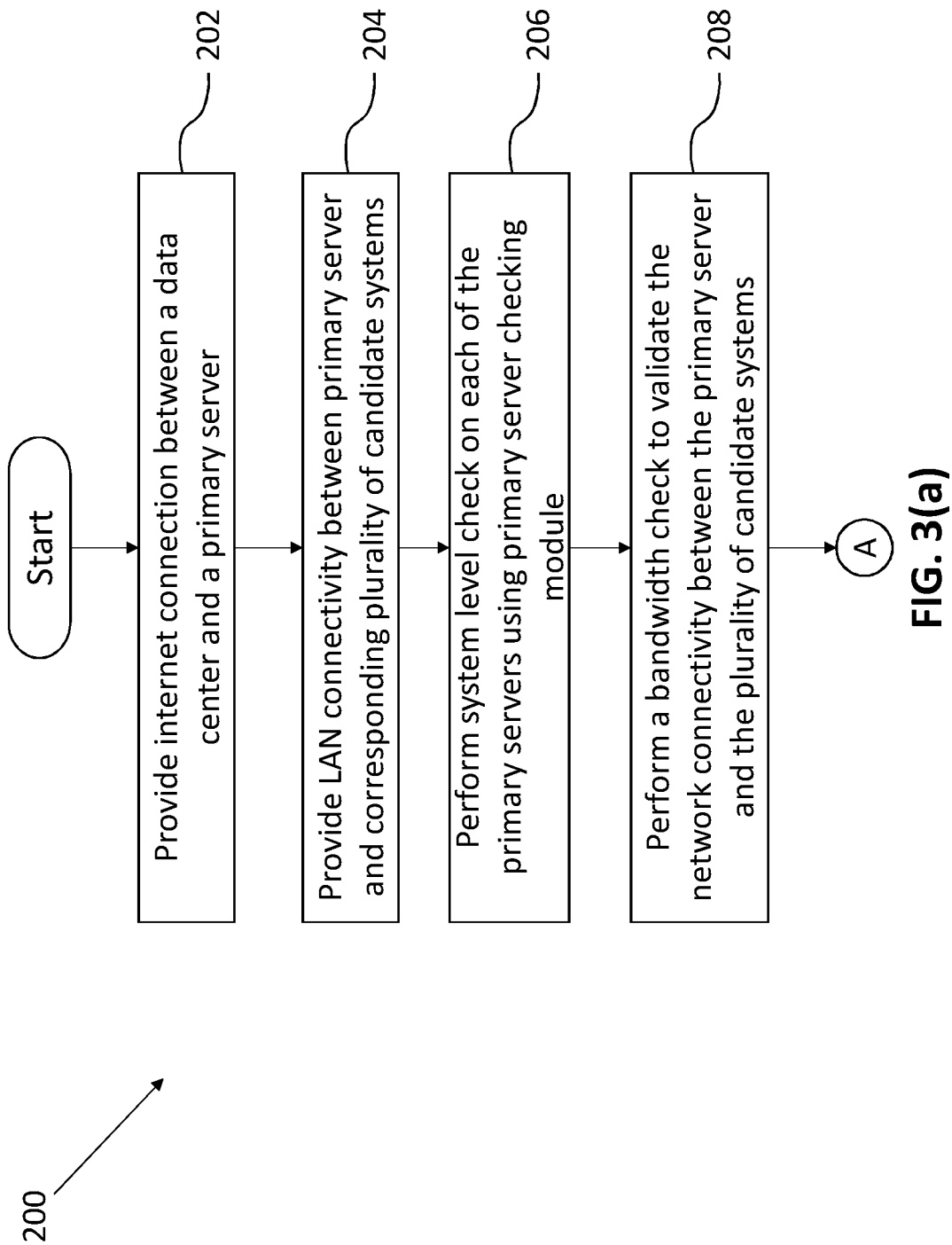
FIGS. 3(a) & (b) is a flowchart illustrating steps involved for conducting audit of an assessment platform, in accordance with an embodiment of the disclosure.

In operation, a flowchart 200 illustrating the steps involved for conducting audit of the assessment platform 102 is shown in FIGS. 3(*a*) & (*b*). Initially at step 202, an internet connection is provided between the data center 110 and the primary servers 114. The data center 110 and the plurality of test centers 112 are the part of the assessment platform 102. Each of the plurality of test centers 112 further comprise the primary server 114 and the plurality of candidate systems 116. The plurality of candidate systems 116 are the personal computers on which the online examination is going to be conducted. At step 204, a LAN connectivity is provided between the primary server 114 and corresponding plurality of candidate systems 116.

At the next step 206, a system level check is performed on each of the primary servers 114 using the primary server checking module 118. Further, at step 208, a bandwidth check is performed to validate the network connectivity between the primary server 114 and the plurality of candidate systems 116 using the primary server checking module 118. Moreover, at step 210, a validation is performed on each of the plurality of candidate systems 116 to certify health on system level parameters.

At the next step 212, the captivation module 120 is provided on each of the plurality of candidate systems 116. At step 214, the captivation module 120 is launched on each of the plurality of candidate systems 116. The launching of the captivation module 120 results in captivation of console of the respective candidate system 116 from the execution of a set of processes. And finally at step 216, an output of the primary server checking module 118 and the captivation module 120 is provided to the data center 110 using the output module 108.

According to an embodiment of the disclosure, the captivation module 120 provides a feature to continue the examination in the disconnected mode in case the network goes off. No matter how much the network is certified it still remains a matter of concern due to inconsistent behavior of hardware components like switch, hub etc. Network failure tends to delay the assessment for long hours creating havoc confusion at the venue. Due to this within the captivation module 120 itself a mechanism is provided to start examination in disconnected mode incase the network goes off during the time of online examination to ensure there is no delay. During the disconnected mode, there is no connectivity between two candidate systems. Though there is a LAN connectivity in the system, but the LAN connectivity allows only the connectivity of the plurality of candidate systems with the server.

According to an embodiment of the disclosure, the captivation module 120 is captivating the console at the operating system level. Thus it is providing solution for the plurality of operating platforms. The captivated module 120 is taking care of multiple variants, not only the most common platforms such as windows and Linux. The captivation module 120 further provides various possibilities within those variants.

During the assessment, the candidate system is used as an inventory of information. All backups related to the assessment on the candidate system itself is backed up through a scheduled backend framework. All the backup data are kept in a highly secure and encrypted manner. Hence whenever the network goes off the captivation module 120 will automatically move into the disconnected mode and execute the assessment through that mode. During the disconnected mode of assessment the captivation module 120 will internally keeping pinging the primary server 1141 to find whether the network is up or not. Till the time the primary server 114 is down all the backup and latest responses of the candidate will be kept securely on the local system itself. The moment network is up, the captivation module 120 will upload all the latest local response to the primary server to synch it with the local backups. Once the candidate completes the assessment from the candidate system 116 and the results are shared to the primary server 114 all the backup is deleted from the candidate system 116. In case the network doesn't come up even after the completion of the online examination the feature is provided to upload the data to the primary server 114 though portable media. All this data are highly secure and authenticated such that it is impossible to tamper the information in any way.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims. The embodiment, thus provides the system and method for securely executing a transaction request using a communication channel.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example. The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

We claim:

1. A method for conducting audit of an assessment platform used for conducting secure online assessment of candidates, the method comprising a processor implemented steps of:
   providing an internet connection between a data center and primary servers, wherein the data center and a plurality of test centers are part of the assessment platform, wherein each of the plurality of test centers comprising the primary server and a plurality of candidate systems;
   providing a LAN (Local Area Network) connectivity between the primary server and corresponding plurality of candidate systems;
   performing a system level check on each of the primary servers using a primary server checking module, wherein the system level check comprises performing a browser test, a bandwidth check, a load simulation test and a ping utility test, wherein the bandwidth check is performed to validate network connectivity between the primary server and the plurality of candidate systems using the primary server checking module;
   performing validation on each of the plurality of candidate systems to certify health on system level parameters;
   providing a captivation module on each of the plurality of candidate systems;
   launching the captivation module on each of the plurality of candidate systems, wherein the launching results in captivation of console of the candidate system from execution of a set of processes except an assessment console till an assessment ends or a candidate chooses to quit the assessment to restrict occurrence of malpractice during the assessment, wherein the captivation module is an authenticated gateway to start the assessment, wherein the set of processes comprises seizing the MAC address, hooking keyboard and mouse of the plurality of candidate systems, enabling/disabling the task manager in the candidate system, setting the browser configurations, closing all running application in the candidate system, removing all desktop component from the candidate system, opening the internet browser in the candidate system, and restricting the remote desktop; and
   providing an output of the primary server checking module and the captivation module to the data center using an output module.

2. The method of claim 1, wherein the assessment platform is classified as reliable to assess a candidate if the bandwidth between the primary server and the plurality of candidate system is more than 800 Kbps (Kilobits per second).

3. The method of claim 1, wherein the system level check comprising checking at least one of processor speed, random access memory (RAM), resolution, DHCP (Dynamic Host Configuration Protocol), platform or internet browser of the primary server.

4. The method of claim 1 further comprising managing the inventory of the assessment by a candidate.

5. The method of claim 1, further configured to operate in a disconnected mode, wherein in the disconnected mode the test center is not connected with the internet connection.

6. The method of claim 1 further comprising sending a log file at the end of the assessment of the candidate.

7. A system for conducting audit of an assessment platform used for conducting secure online assessment of candidates, the system comprising:
   a data center connected to a plurality of test centers;
   primary servers present in each of the plurality of test centers;
   a plurality of candidate systems connected to each of primary servers;
   a memory;
   a processor in communication with the memory, wherein the processor further comprising:
   a primary server checking module present on each of the primary servers, wherein the primary server checking module is configured to perform at least one of the following:
   performing a system level check on each of the plurality of primary servers,
   performing a browser test on each of the plurality of candidate systems,
   performing a bandwidth test between the primary server and the plurality of candidate systems, wherein the bandwidth check is performed to validate network connectivity between the primary sever and the plurality of candidate systems using the primary server checking module,
performing a load simulation test in the entire LAN (Local Area Network) network, or
performing a ping utility test between the plurality of candidate systems and the primary server;
a captivation module present on each of the plurality of candidate systems, wherein the captivation module configured to captivate a console of the candidate system from execution of a set of processes except an assessment console till an assessment ends or a candidate chooses to quit the assessment to restrict occurrence of malpractice during the assessment, wherein the captivation module is an authenticated gateway to start the assessment, wherein the set of processes comprises seizing the MAC address, hooking keyboard and mouse of the plurality of candidate systems, enabling/disabling the task manager in the candidate system, setting the browser configurations, closing all running application in the candidate system, removing all desktop component from the candidate system, opening the internet browser in the candidate system, and restricting the remote desktop; and
an output module for providing the output of the primary server checking module and the captivation module with the data center.

8. The system of claim 7, wherein the assessment platform is an online assessment platform for assessing the candidate.

9. A non-transitory computer readable medium storing one or more instructions which when executed by a processor on a system, cause the processor to perform method for conducting audit of an assessment platform used for conducting secure online assessment of candidates comprising:
providing an internet connection between a data center and primary servers, wherein the data center and a plurality of test centers are part of the assessment platform, wherein each of the plurality of test centers comprising the primary server and a plurality of candidate systems;
providing a LAN (Local Area Network) connectivity between the primary server and corresponding plurality of candidate systems;
performing a system level check on each of the primary servers using a primary server checking module, wherein the system level check comprises performing a browser test, a bandwidth check, a load simulation test and a ping utility test, wherein the bandwidth check is performed to validate network connectivity between the primary sever and the plurality of candidate systems using the primary server checking module;
performing validation on each of the plurality of candidate systems to certify health on system level parameters;
providing a captivation module on each of the plurality of candidate systems;
launching the captivation module on each of the plurality of candidate systems, wherein the launching results in captivation of console of the candidate system from execution of a set of processes except an assessment console till an assessment ends or a candidate chooses to quit the assessment to restrict occurrence of malpractice during the assessment, wherein the captivation module is an authenticated gateway to start the assessment, wherein the set of processes comprises seizing the MAC address, hooking keyboard and mouse of the plurality of candidate systems, enabling/disabling the task manager in the candidate system, setting the browser configurations, closing all running application in the candidate system, removing all desktop component from the candidate system, opening the internet browser in the candidate system, and restricting the remote desktop; and
providing an output of the primary server checking module and the captivation module to the data center using an output module.

\* \* \* \* \*